Nov. 24, 1964   A. GIOVANNETTI, JR., ETAL   3,158,172
HIGH-TEMPERATURE, HIGH-PRESSURE SPHERICAL SEGMENT VALVE
Filed Aug. 2, 1960   8 Sheets-Sheet 1

ANGELO GIOVANNETTI
RUSSELL M. HIMMELRIGHT
KENNETH A. MEYER
HAKUZO NITTA
  INVENTORS

BY
  ATTORNEYS

Nov. 24, 1964  A. GIOVANNETTI, JR., ETAL  3,158,172
HIGH-TEMPERATURE, HIGH-PRESSURE SPHERICAL SEGMENT VALVE
Filed Aug. 2, 1960  8 Sheets-Sheet 2
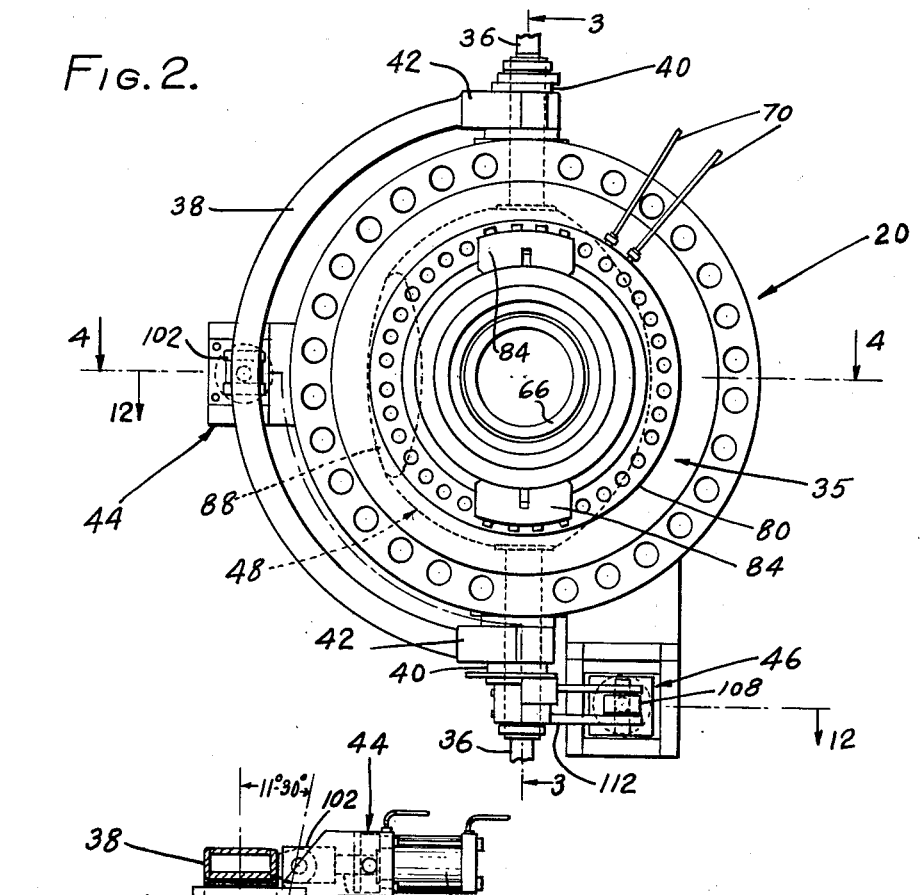
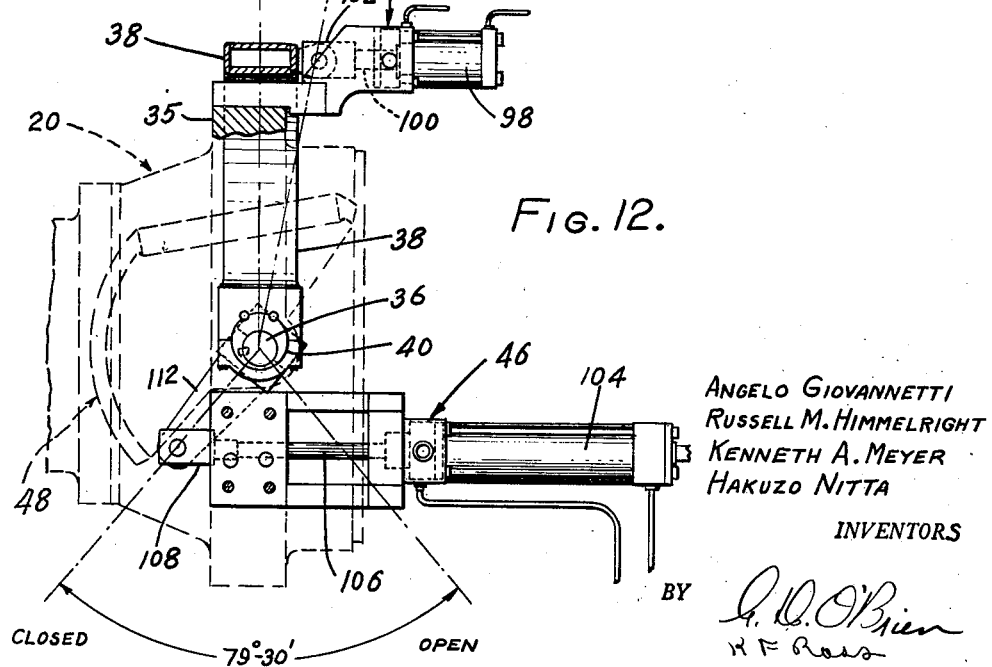
ANGELO GIOVANNETTI
RUSSELL M. HIMMELRIGHT
KENNETH A. MEYER
HAKUZO NITTA
INVENTORS
BY
ATTORNEYS Nov. 24, 1964  A. GIOVANNETTI, JR., ETAL  3,158,172
HIGH-TEMPERATURE, HIGH-PRESSURE SPHERICAL SEGMENT VALVE
Filed Aug. 2, 1960   8 Sheets-Sheet 4

ANGELO GIOVANNETTI
RUSSELL M. HIMMELRIGHT
KENNETH A. MEYER
HAKUZO NITTA

INVENTORS

BY

ATTORNEYS

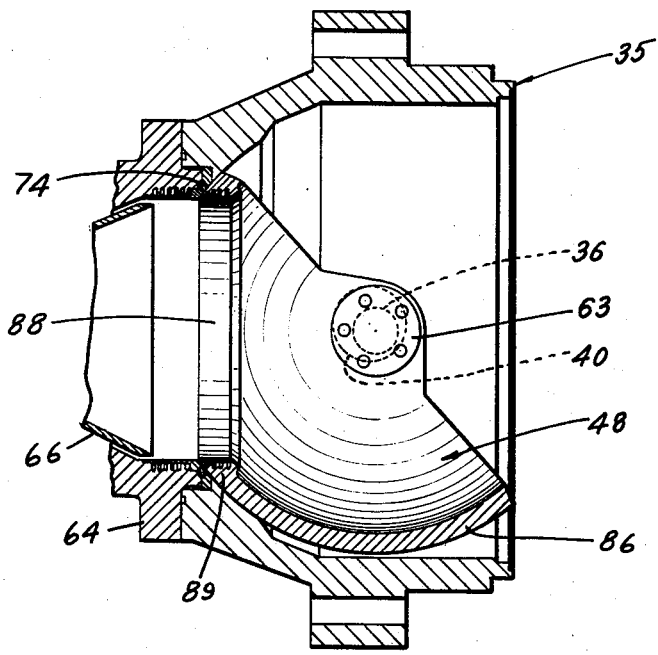
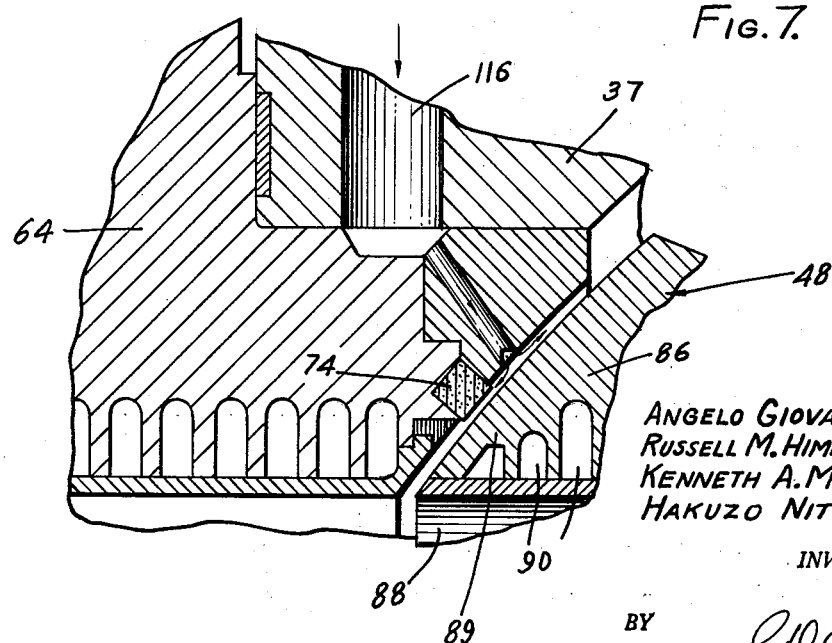

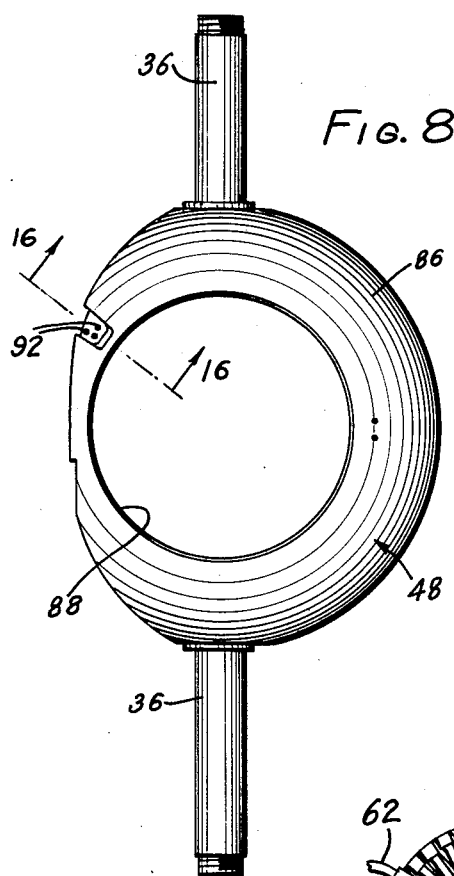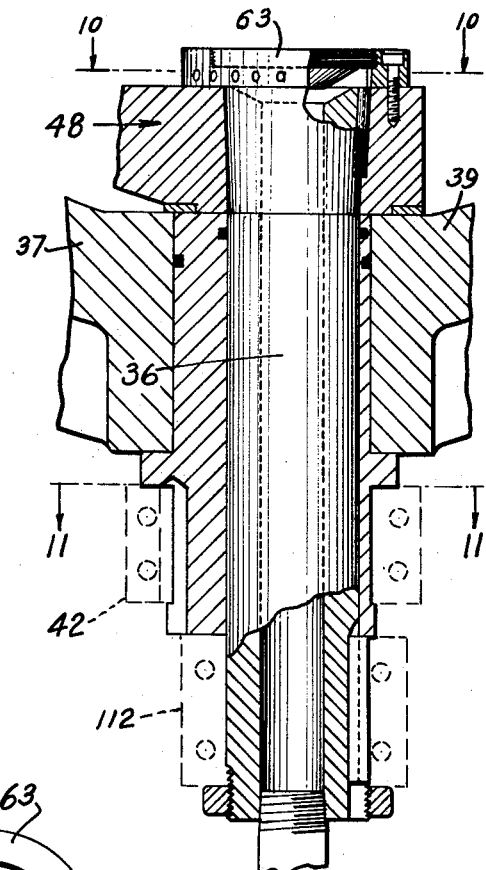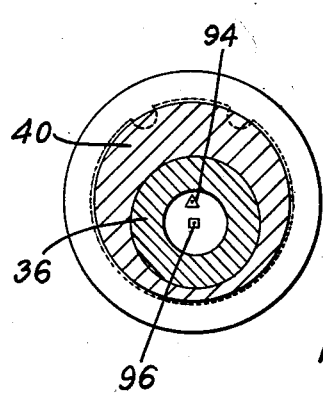

Nov. 24, 1964  A. GIOVANNETTI, JR., ETAL  3,158,172
HIGH-TEMPERATURE, HIGH-PRESSURE SPHERICAL SEGMENT VALVE
Filed Aug. 2, 1960                               8 Sheets-Sheet 8

ANGELO GIOVANNETTI
RUSSELL M. HIMMELRIGHT
KENNETH A. MEYER
HAKUZO NITTA
         INVENTORS

BY
         ATTORNEYS

United States Patent Office 3,158,172
Patented Nov. 24, 1964

3,158,172
HIGH-TEMPERATURE, HIGH-PRESSURE
SPHERICAL SEGMENT VALVE
Angelo Giovannetti, Jr., San Jose, Russel M. Himmelright, Menlo Park, and Kenneth A. Meyer and Hakuzo Nitta, Palo Alto, Calif., assignors to the United States of America as represented by the Administrator of the National Aeronautics and Space Administration
Filed Aug. 2, 1960, Ser. No. 47,123
1 Claim. (Cl. 137—340)
(Granted under Title 35, U.S. Code (1952), sec. 266)

The invention described herein may be manufactured and used by or for the Government of the United States of America for governmental purposes without the payment of any royalties thereon or therefor.

This invention relates to a valve mechanism for stopping and starting the flow of fluid in pipes, more particularly, it relates to a valve incorporating a valve element or eyelid for performing this function.

The construction and operation of the valve mechanism of this invention is illustrated in connection with a typical application, that is, its use to start and stop the flow of high-temperature, high-pressure gas in a conduit connecting a gas heating unit and a wind tunnel, the gas to be used in wind tunnel tests on missile models. The valve mechanism, however, is in no way limited to this application, as it may be used in any application wherein it is necessary to start and stop the flow of a fluid in pipes either under low or high temperatures and pressures.

Prior art valve mechanisms for starting and stopping the flow of fluid in pipes are subject to a number of disadvantages. Their bulkiness made their use objectionable in applications wherein space limitations were critical. They were so constructed that the valve element in opening and closing was in contact with the surfaces of the gaskets or seals used to provide fluid tightness. In a short time the gaskets or seals would not perform their function because of excessive wear due to the surface of the valve element sliding on them. Prior art valves of this type were unsatisfactory for starting and stopping the flow of gases at high temperatures and pressure due to the fact that the sealing construction would not withstand these high temperatures and pressures for extended periods.

It is, therefore, an object of this invention to provide a valve mechanism for starting and stopping the flow of fluids in pipes which will satisfy operating requirements and restricted space limitations.

It is another object of this invention to provide a valve mechanism for the purpose stated in which the valve element is out of contact with sealing elements while it is being opened and closed.

It is a further object of this invention to provide a valve mechanism for the purpose stated which is operative for starting and stopping the flow of gases at very high temperatures and pressures with a minimum of pressure drop through the valve mechanism.

The valve mechanism of this invention comprises a valve body, casing or housing for insertion in axial alignment between conduit sections and includes a valve element mounted on a shaft within the housing for rotation to open and close the valve. The valve element shaft is mounted at the center of the valve element and is journaled in an eccentrically bored sleeve having an axis of rotation slightly removed from that of the valve element shaft. The eccentric sleeve and the shaft rotate independently of each other. The valve mechanism is mounted with the valve element shaft perpendicular to the direction of flow of fluid in the conduit. Sequential rotation of the eccentric sleeve and the valve shaft in that order serves to first move the valve element laterally away from the sealing element between its outside surface and the downstream pipe segment, and then to rotate it into the open position. A system of cooling ducts for the introduction of cooling fluid are provided to cool all surfaces subjected to high temperatures. Means are provided for furnishing a blanket of cool air over all sealing surfaces to protect them from high-temperature gases while the surfaces are uncovered during the movement of the valve element.

The construction and operation of the invention is explained in the following description supplemented with the accompanying drawings, hereby made a part of this specification and in which, FIG. 1 is a pictorial representation of a typical installation of the valve mechanism;

FIG. 2 is a front elevational view of the valve mechanism with the valve in the closed position;

FIG. 6 is a view similar to that of FIG. 5 in which the valve is shown in the sealed position after opening;

FIG. 7 is an enlarged view of a section of the valve and seat showing the cooling ducts;

FIG. 8 is an elevational view of the gate section of the valve element;

FIG. 9 is an enlarged partial section of the valve element shaft and eccentric sleeve;

FIG. 10 is a partial section taken on the line 10—10 of FIG. 9 showing the lower valve element shaft manifold;

FIG. 11 is a section through the valve element shaft and the eccentric on the line 11—11 of FIG. 9;

FIG. 12 is a plan view of the operational linkages taken on the line 12—12 of FIG. 2;

Figure 1:
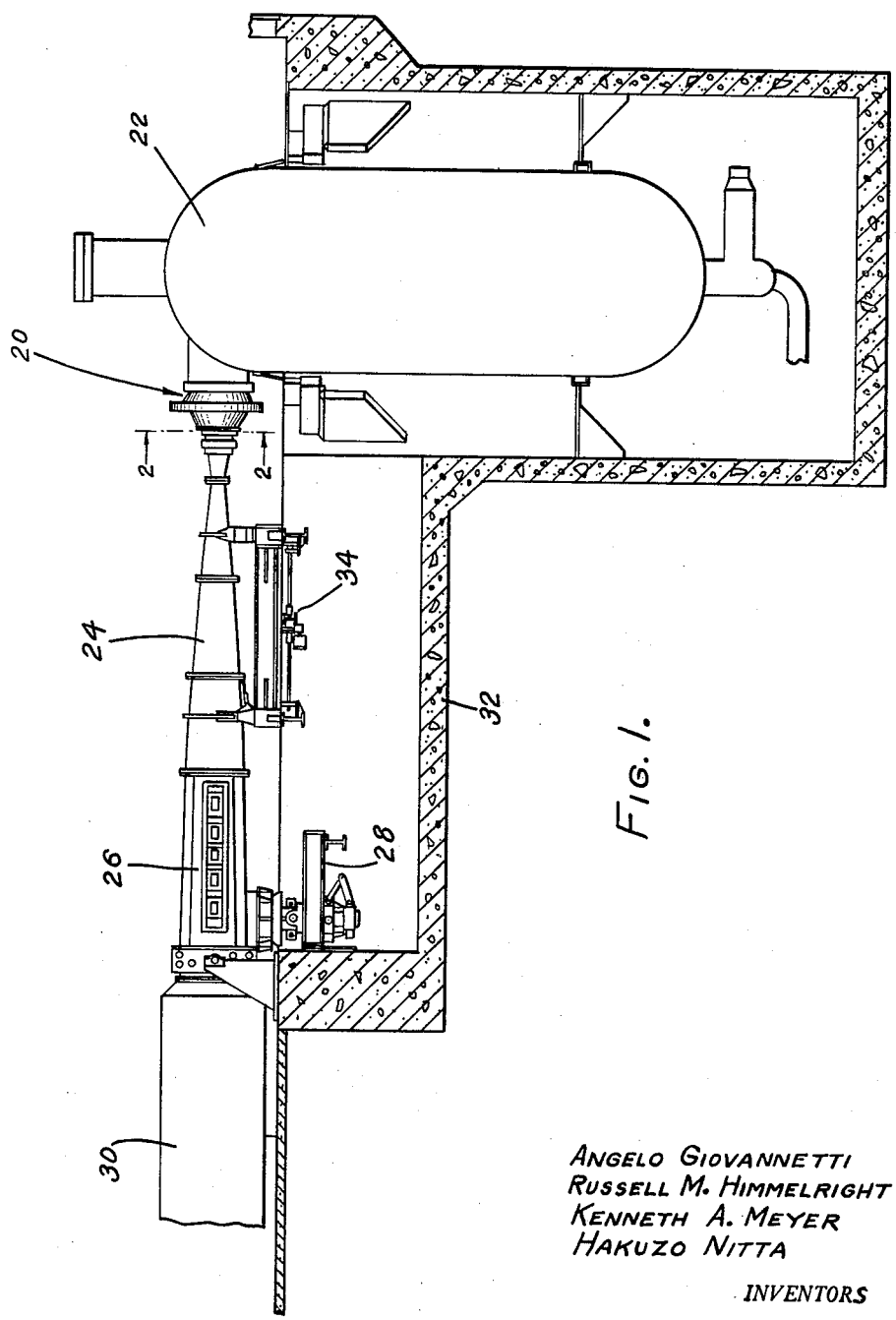

Reference is now made to FIG. 1 which depicts a typical installation of the valve. The valve mechanism 20 is shown connected to an air heater 22 on one side by means of a flanged pipe connection or other convenient means, and to a wind tunnel nozzle 24 on the opposite or downstream side by conventional connecting means. The wind tunnel nozzle 24 is connected to the test section 26 wherein a model to be tested is supported by model support 28. A diffuser section is shown at 30 connected to the test section. The assembly is supported by the concrete foundation 32 as shown. In operation, air is heated to about 3500° F. in heater 22 and transferred under a pressure of 2000 p.s.i.g. to the wind tunnel test section 26 for testing missile models under hypersonic wind conditions. The air is heated in the beginning to give it sufficiently high inital temperature to prevent its cooling below liquification temperature when it expands on passing through the nozzle. A transfer carriage 34 is provided for alternately rotating one of a plurality of nozzles into operating position.

Figure 3:
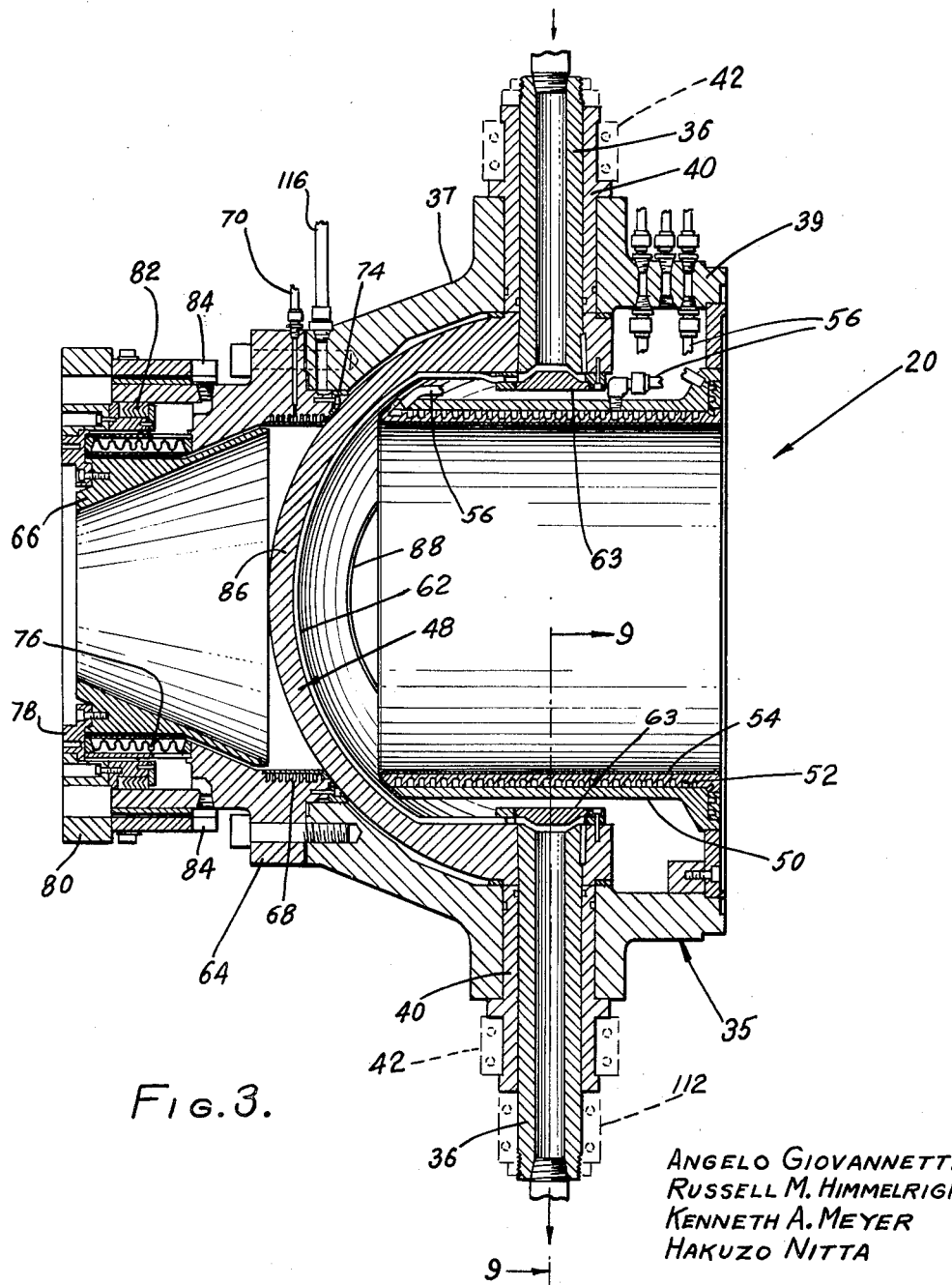
FIG. 3 is a vertical section of the valve mechanism on line 3—3 of FIG. 2.

Referring to FIGS. 2 and 3, the valve body or casing 35 comprising areas 37 and 39 (FIG. 3) defines a valve chamber and valve seat. The hollow valve element shaft is shown at 36. Yoke 38 is connected to eccentric sleeve 40 by means of connecting sleeve 42 for rotation of the eccentric sleeve 40 about longitudinal axis 94 (FIG. 11). The shaft and eccentric sleeve each consist of an upper and lower section, as shown; however, they are each referred to herein and in the claim unless otherwise specified as single elements as including two sections as the construction and operation of the sections are identical. The yoke actuating mechanism is shown generally at 44 and the mechanism for actuating the shaft 36 of the valve element, or eyelid, is shown generally at 46.

Reference is now made to FIG. 3 for a more detailed description of the construction of the valve mechanism. As shown, the hollow eyelid shaft 36 is journaled in the eccentric sleeve 40 for rotation therein. Sleeve 40 is eccentrically bored for receiving shaft 36. The eccentric sleeve 40 is rotatable within the valve body 35. The valve element 48 is attached to the shaft 36 and is rotatable therewith.

Figure 4:
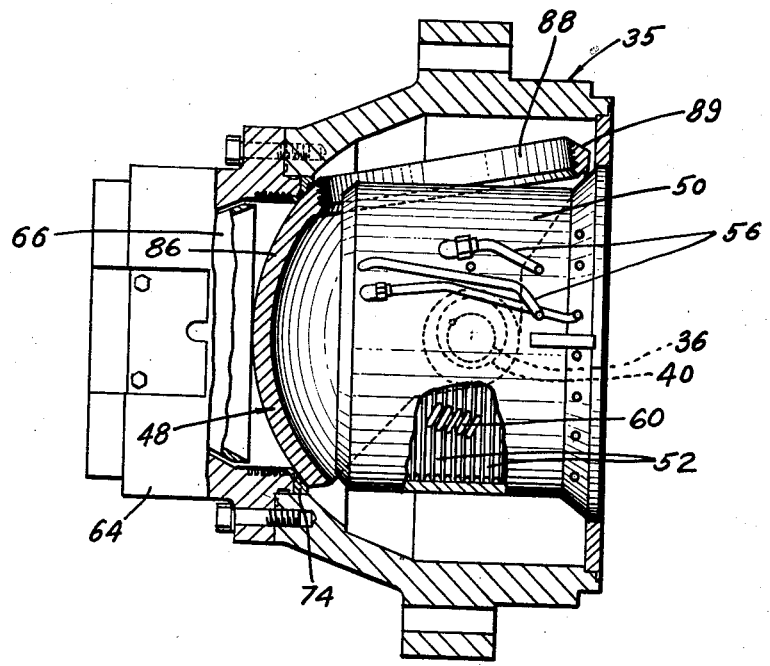
FIG. 4 is a plan view of an enlarged section of the valve taken on the line 4—4 of FIG. 2 showing the valve in the closed position.

Inlet nozzle 50 is provided for introducing fluid into the interior of the valve body. For cooling the inlet nozzle 50, spiral cooling ducts 52 are provided between the inlet nozzle and insulating liner 54. In FIG. 4, inlet pipes 56 for introducing cooling fluid into the system of cooling ducts 52 of the inlet nozzle 50 are shown. Also shown at 60 in FIG. 4 are crossover channels connecting the cooling ducts 52. A valve element master pipe 62 (FIG. 3) is provided for supplying cooling fluid to a system of pipes or channels in valve element 48 as will be explained later. Circular manifold 63 is mounted as shown to distribute cooling fluid from the channel in shaft 36 to master pipe 62.

A flanged bonnet 64 is bolted to valve body section 37 for supporting outlet cone 66 in position to transfer fluid from the valve body to a nozzle pipe segment to be attached to the downstream side of the outlet cone as shown in FIG. 1. The bonnet 64 is provided with cooling pipes or channels 68 as shown which are supplied with cooling fluid through inlet pipe 70. High temperature, high-pressure gaskets are provided between connecting parts throughout as shown. Circular closure seal or gasket 74 supported on bonnet 64 serves to effect fluid-tight closure between the bonnet and the outside of valve element 48 when the valve is in the closed or open position. For compensating for expansion and contraction of nozzle 24 secured to outlet cone 66, the cone is supported in a floating relationship by means of expansible bellows 76 and the supporting construction formed by inner connecting ring 78, outer connecting ring 80, packing gland 82 and alignment guide 84. As nozzle 24 expands and contracts from temperature changes due to hot gases traveling therethrough, cone 66 moves back and forth through the action of expansible bellows 76 and the surrounding construction in which it is mounted.

Figure 5:
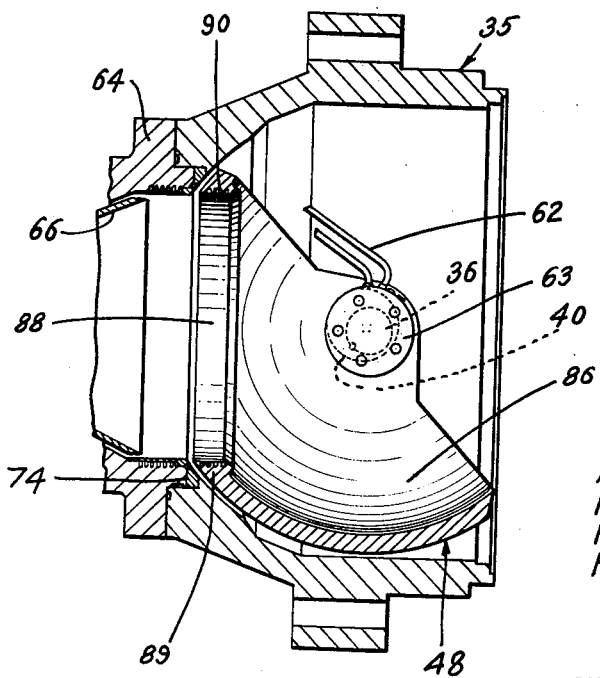
FIG. 5 is a view similar to FIG. 4 with the valve shown in the open position.
Figure 15:
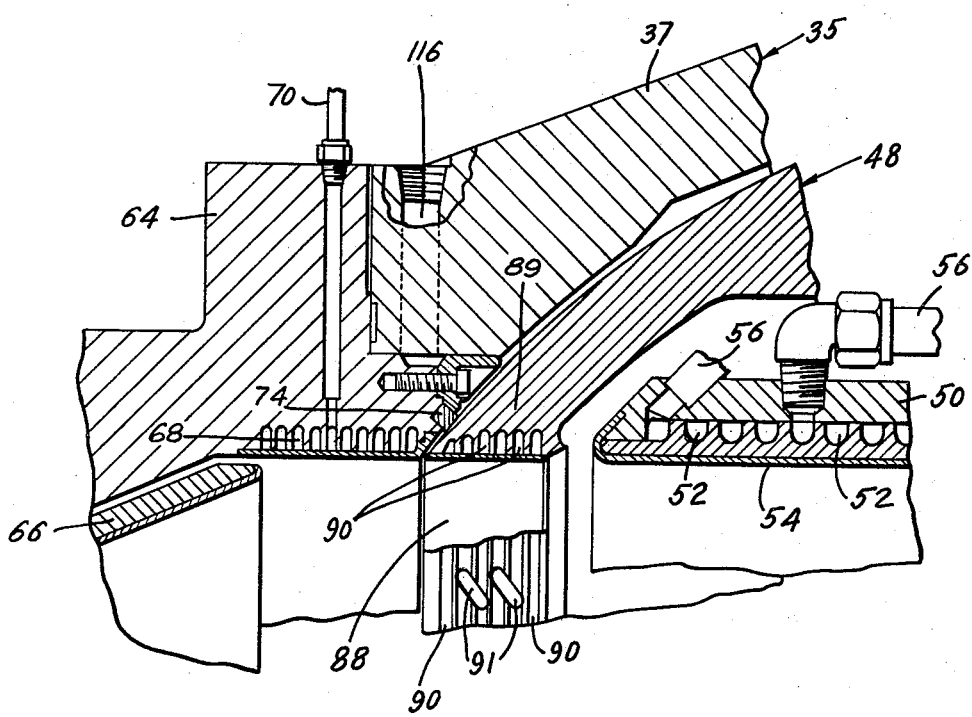
FIG. 15 is an enlarged portion of the valve body and eyelid showing part of the cooling system.
Figure 16:
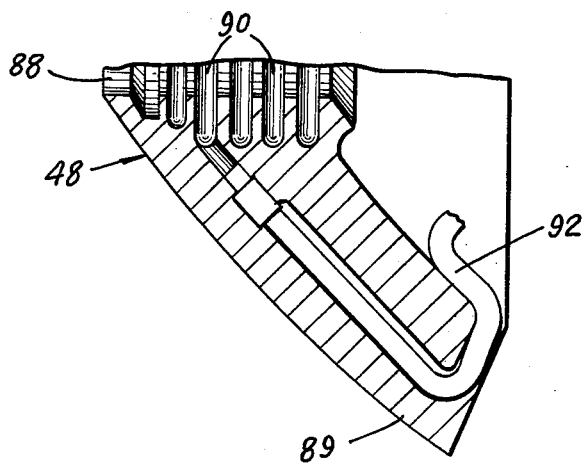
FIG. 16 is an enlarged sectional detail of a portion of the valve element taken on line 16—16 of FIG. 8 showing water connections.

The structure of valve element 48 is illustrated in FIGS. 4, 5, and 6. The valve element is a spherically shaped segment and consists of closure section 86 and a gate section 88 having a circular opening as shown. Both the rim 89 of the gate section 88 and the spherical closure section 86 of the valve element are cooled by means of a system of pipes or channels 90 as shown in FIGS. 5, 6, 7, 15, and 16. Crossover channels 91 connect pipes 90 as shown in FIG. 15. The internal structure of the gate section of the valve element 48 is shown in FIG. 8. The pipes 90 are supplied by transfer pipe 92 as shown in FIG. 16 connected to master pipe 62.

Figure 13:
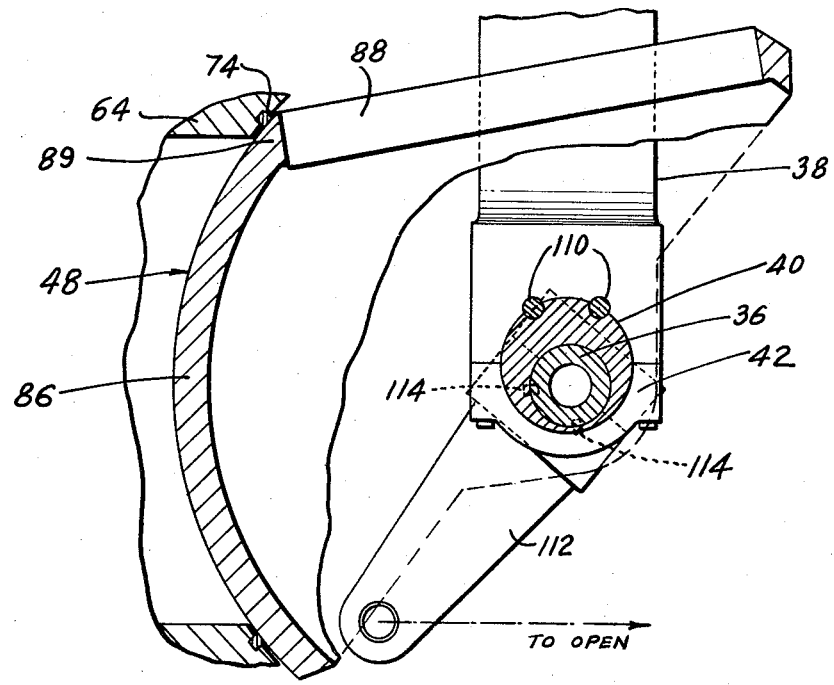
FIG. 13 is a partial plan view of a section showing the arrangement of the valve element shaft, eccentric, eyelid crankshaft and yoke, the valve being in a closed position.
Figure 14:
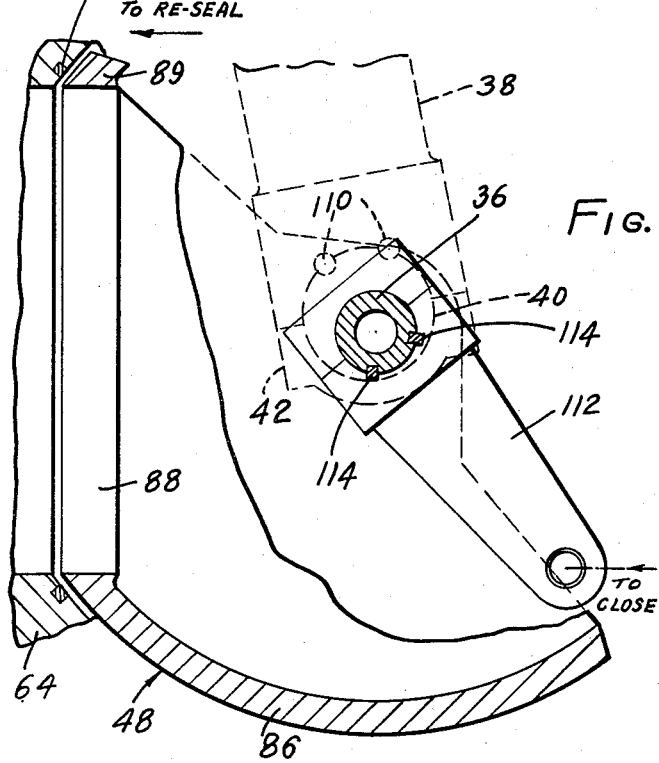
FIG. 14 is a view similar to that of FIG. 13 showing the yoke and eccentric sleeve in phantom.

A particular novel and advantageous feature of the invention is the construction by which the valve is opened and closed by a sequence of movements which prevent it from sliding on seal 74. The valve element is first moved laterally away from its seat at the closed position, then rotated into the open position with the gate section adjacent the downstream opening and finally the gate section moved to a sealing position with the outer convex surface of the valve element 48 against the seal 74. It is closed by the reverse sequence of movements. This construction will now be explained. Referring to FIG. 11 it will be noted that the eccentrically bored sleeve 40 rotates around its axis 94, and the eyelid shaft which is mounted on the center of the eyelid rotates around its center 96. The construction of the eccentric 40 is further illustrated in FIG. 9. It will be noted that as the eccentric 40 is rotated about its center 94 the eyelid shaft will be moved laterally, thus moving the closure section 86, or the gate section 88 as the case may be, laterally away from the seat. Referring to FIG. 12, it is seen that the construction permits the rotation of the eccentric by means of yoke 38 and its actuating mechanism 44 through an angle of 11°30′ which can then be followed by rotation of the eyelid shaft through an angle of 79°30′ by means of actuating mechanism 46. The yoke actuating mechanism comprising hydraulic cylinder 98, connecting rod 100 and linkage 102 is shown in FIG. 12. The eyelid shaft actuating mechanism comprising hydraulic cylinder 104, connecting rod 106 and linkage 108 is shown in FIG. 12. FIGS. 13 and 14 illustrate the manner of connecting the eccentric 40 to the yoke 38 by means of yoke pins 110 and the manner of connecting eyelid shaft 36 to crank 112 by means of crank pins 114. FIGS. 3, 4 and 13 show the valve element in the closed position with its outer convex surface sealed against the gasket 74. FIGS. 5, 7, and 14 show the valve element in the open position with the gate section 88 aligned with the outlet cone 68 in a position for sealing the valve element 48 against gasket 74. FIG. 6 shows the gate section 88 aligned with the valve passageway with the outer convex surface of the valve element sealed against gasket 74 this being the operating position of the valve in open position. The operation of the yoke 38 to unseal the outer convex surface of the closure section of the valve element from gasket 74 as the valve is opened and to reseal the outer convex surface of the valve element against gasket 74 with the valve in the open position is shown in FIGS. 13 and 14. The construction by which valve crank 112 rotates the closure section 86 through 79°30′ to the open position after the valve element has first been moved laterally away from the seat (by rotation of the yoke 11°30′), is shown in FIG. 13. The reverse operation is shown in FIG. 14. The yoke and eyelid shaft actuating mechanisms are controlled by microswitches of a conventional design, not shown, to provide the following sequence of operations starting with the valve in the closed position. First the yoke is actuated through 11°30′ to unseal the valve element through lateral movement; second the eyelid shaft actuating mechanism is actuated to rotate the valve element through an angle of 79°30′ to the open position with the gate section in line with the downstream outlet; and third, the yoke is moved in a direction opposite to its former movement through an angle of 11°30′ to reseal the outer convex surface of the valve element against the gasket 74 with the gate in open position. The purpose for sealing when the gate section is in open position is to prevent hot gases from passing between the rim 89 of the gate section and the valve housing and cause damage to metal surfaces and gaskets by their extreme heat. The sealing action also prevents heat from the pebble bed heater 22 from contacting surfaces of the valve which would be damaged thereby. It will be noted that during the opening and sealing of the valve, seal 74 and various adjacent metal parts will be exposed to hot gases unless some means is provided for preventing this. In order to protect these parts from hot gases a blanket of cool air or other gas under high pressure is introduced in sequence with the valve operation and maintained over the seal and adjacent surfaces until the closure section or gate section is in sealing position, as the case may be. The cool gas is under pressure greater than the pressure of the hot gases within the valve and is introduced through gas inlet 116 as shown in FIGS. 3 and 7.

The valve of this invention was constructed for the application in which it is illustrated, with a diameter of 22 inches. As will be seen the structure provides extreme compactness for this diameter valve. The valve under test has withstood 600 p.s.i. in the closed position and 2,000 p.s.i. in the open position. It will convey air at a temperature of at least 3500° F. at 2,000 p.s.i.g. with negligible pressure drop.

It will be apparent from the above description that many modifications are possible in the light of the above teaching. It is, therefore, to be understood that within the scope of the appended claim the invention may be practiced otherwise than as specifically described herein.

What is claimed is:

A valve comprising a casing have a passageway extending therethrough about a longitudinal axis and surrounded by a valve seat, a spherical segment valve element having a closure section and a gate section and mounted in said casing for rotation between a closed position with the closure section closing said passageway and an open position with the gate section aligned with said passageway, said valve seat comprising a circular sealing member, said sealing member forming a seal with the surface of said valve element, and means connected to said valve element for effecting sequential opening and closing of said valve element, said last specified means operating to open said passageway by sequentially moving said valve element along said passageway away from said valve seat, pivotally rotating said valve element to the position in which said gate section is aligned with said passageway and seating said gate section against said sealing member by moving said valve element along said passageway toward said valve seat, said last specified means operating to close said passageway by a reverse sequence of the operations required to open it, a fluid-cooled inlet nozzle supported in said casing on the upstream side of said valve seat and said valve element, said nozzle having a longitudinal axis in alignment with said passageway longitudinal axis, means connected to said casing for cooling said sealing member when said valve element is in motion, means connected to said valve element for cooling said valve element, said cooling means comprising a two-section hollow shaft connected to said valve element, a source of cooling fluid coupled to said shaft, a master pipe, a circular manifold for diverting fluid from the hollow of said valve element shaft into said master pipe, and a system of distributing pipes internally of said valve element, said fluid being forced into one section of said valve element shaft, circulated internally of said valve element through said system of pipes and out the other section of said valve element shaft.

References Cited by the Examiner

UNITED STATES PATENTS

| 1,442,452 | 1/23 | Taylor | 251—161 |
| 1,586,725 | 1/26 | Westinghouse et al. | 285—226 |
| 1,951,677 | 3/34 | Rosener | 137—340 |
| 2,467,945 | 4/49 | Pottmeyer | 137—340 |
| 2,811,981 | 11/57 | Harris | 137—340 |

FOREIGN PATENTS 135,288  11/29  Switzerland.

OTHER REFERENCES

Instrumentation, vol. 6, #4, page 24, March 1953, 73–147.

M. CARY NELSON, *Primary Examiner.*